June 11, 1957  E. B. HAMMOND, JR  2,795,143

ELECTROMAGNETIC FORCE-PRODUCING SYSTEM

Filed Sept. 24, 1952

INVENTOR
EDMUND B. HAMMOND, JR.
BY
ATTORNEY

2,795,143
Patented June 11, 1957

2,795,143
ELECTROMAGNETIC FORCE-PRODUCING SYSTEM

Edmund B. Hammond, Jr., North Merrick, N. Y., assignor to Sperry Rand Corporation, a corporation of Delaware Application September 24, 1952, Serial No. 311,290

7 Claims. (Cl. 74—5.4)

This application is a continuation-in-part of my copending application S. N. 244,761, filed on September 1, 1951.

My invention relates, generally, to force-producing systems of the electromagnetic type, and the invention has reference, more particularly, to a novel system of this character wherein the force produced varies directly in accordance with the product of a plurality of quantities supplied as input currents.

Taking the difference between the respective squares of the sum and difference of two input quantities to obtain the product thereof is generally known as the quarter-squares method of multiplication. Prior art arrangements employing this method have usually required means such as squaring cams and squaring amplifiers for providing the squares of the sum and difference terms. Moreover, it has been necessary heretofore to employ further means such as subtraction networks and differential gears to obtain the difference between these square terms, hence, the product sought. In the present invention, however, the same device employed for providing the squares of the sum and difference terms is capable of providing the difference thereof.

According to my invention, I provide a system wherein an armature cooperating with a pair of electromagnets is acted upon in opposite directions by magnetic forces, one of which is proportional to the square of the sum of two input currents, the other force being proportional to the square of the difference of the two input currents. The net or resultant force tending to move the armature, therefore, has a value equal to the difference between the oppositely-directed forces and is proportional to the difference between the squares of the sum and difference of the input currents. That is to say, if the input currents are $I_1$ and $I_2$, the net force $F$ is proportional to $$(I_1+I_2)^2-(I_1-I_2)^2$$

This expression is readily reduced to the simplified form thereof which is $4I_1I_2$. Hence, it is seen that the net force $F$ developed in the present invention is proportional to the product $I_1I_2$ of the two input currents.

Although a force-producing system of the nature generally described may be put to a number of uses, I have found it particularly advantageous for use as a torquer arrangement for precessing a gyroscope at a rate dependent upon the product of two electrical quantities. A typical example of an arrangement of this sort is disclosed in the aforesaid copending application S. N. 244,761 wherein an aircraft may be controlled by reference to a computer-actuated indicator to pursue a prescribed flight path for the launching and guidance of a self-propelled missile. A gyroscope forms part of the computer; and in the course of the solution of the flight path problem, the gyroscope is torqued in accordance with the product of two variables which are derived elsewhere in the computer. As the gyroscope precesses at a rate in proportion to the torque applied thereto, a pickoff means cooperating with the gyroscope generates a signal which is connected via further computing stages to control the reference indicator, whereby the aircraft is kept on the prescribed flight path.

The primary object of my invention is to provide a novel system for producing a force of a magnitude proportional to the product of two electrical inputs and of a direction in accordance with the sign of said product.

Another object is the provision of means including a pair of electromagnets for exerting oppositely-directed magnetic forces on an object such as an armature whereby the net force exerted on the object varies in accordance with the product of two input currents supplied to said force producing means.

Another object is to provide a gyroscope torquer system including a pair of electromagnets for exerting a net torque on a gyroscope such as to cause the instrument to precess in a direction and at a rate dependent on the sign and the product of the input currents supplied to the system.

With the foregoing and still other objects in view, my invention includes the novel combinations and arrangements of elements described below and illustrated in the accompanying drawings, in which—

The magnetic force obtainable from an electromagnet equipped with a single winding is proportional to the square of the energizing current flowing in the winding; and, where the electromagnet is equipped with two windings, each carrying a separate current, the magnetic force that may be obtained is proportional to either the square of the sum of the individual currents or the square of the difference, depending, respectively, on whether the core fluxes created are of an aiding nature or of an opposing nature.

Figure 1:
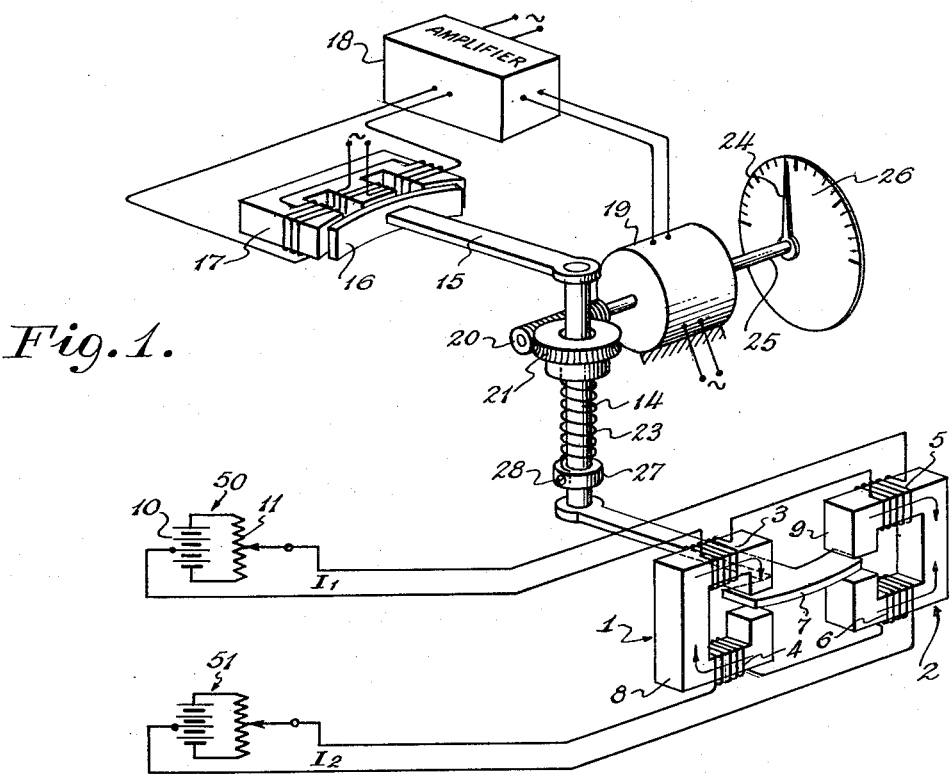
Fig. 1 shows one form of the present invention embodied in a multiplier for providing an indication of the product of two electrical inputs.

In the embodiment of my invention shown in Fig. 1, two fixed electromagnets 1, 2 are provided, one being equipped with a set of two windings 3, 4 arranged to produce aiding fluxes in its core, and the second being equipped with a set of two windings 5, 6 arranged to produce opposing fluxes in its core. All windings are substantially identical. Thus, if one winding of each set is energized with a current $I_1$ and the other with a current $I_2$, the force derived in the electromagnet where the fluxes aid will be proportional to $(I_1+I_2)^2$. In the other electromagnet where the fluxes oppose, the force derived will be proportional to $(I_1-I_2)^2$. Hence, a single armature 7 placed in the field of both electromagnets and arranged so that its movement toward one must be concomitant with its movement away from the other will be urged to move by a net force proportional to the difference $$(I_1+I_2)^2-(I_1-I_2)^2$$

between the forces exerted on the armature by the two electromagnets. Since this expression reduces to $4I_1I_2$, the net force is seen to be proportional to the product of the energizing currents $I_1$ and $I_2$.

For illustrative purposes, electromagnets 1, 2 of Fig. 1 have been shown as comprising two generally C-shaped cores 8, 9, respectively. Windings 3, 5 are wound about the upper legs of cores 8, 9, respectively, while windings 4, 6 are wound about the lower legs of cores 8, 9, respectively. To illustrate that windings 3, 5 are energized by a current $I_1$ proportional to a first quantity, I have shown the windings as connected in series across the terminals of a variable current source 50. Source 50 includes a battery 10 having a center-tap serving as one of the terminals of the source, and connected across the battery is a potentiometer 11 equipped with a wiper or sliding contact serving as the other terminal of the source. By this arrangement, the current supplied to series-connected windings 3, 5 by source 50 is variable in sign and magnitude, depending on the position of the wiper relative to the resistance element of potentiometer 11. Similarly, windings 4, 6 are preferably connected in series across the terminals of a variable current source 51, shown for illustration purposes to be substantially the same as source 50. Source 51 therefore supplies a current $I_2$ proportional to a second quantity. Thus, the current $I_2$, serving to energize windings 4, 6 may be varied in sign and magnitude in the same manner as current $I_1$. It is to be further noted that windings 3, 4 are wound on core 8 in a manner whereby the fluxes they produce in the core 8 are in the same direction or are of an aiding nature. On the other hand, windings 5, 6 are wound on core 9 in a manner whereby the fluxes produced thereby are in opposite directions or are of an opposing nature.

Cores 8, 9 are preferably spaced and arranged relative to each other so as to cooperate with armature 7 which may, for example, be of a flat and generally T-shaped design. At the end of its stem portion, the armature is preferably fixed to a rotatable shaft 14 so that the armature may freely pass through the open portions or air gaps of the C-shaped cores 8, 9. Normally, armature 7 is centered between the electromagnets, and the respective end portions of its cross-bar are disposed slightly within the air gaps on either side of the stem.

By this arrangement, the net force exerted on armature 7 will be proportional to the product of the energizing currents, $I_1$ and $I_2$, so long as travel of the armature is confined to a region extending from its normal position to a position relatively close to one or the other of the open ends of the respective air gaps. Accordingly, I have provided means whereby the travel of the armature is held to a negligible amount, and at the same time, a measure of the net magnetic force urging the armature to move is obtained. While this may be accomplished by connecting shaft 14 to a strain gauge of a well-known type, I prefer, instead, to provide a follow-up servomechanism arranged to continuously balance the net magnetic force on armature 7 with a variable resilient force. In this regard, shaft 14 is connected to one end of an arm 15. In order to detect rotation of shaft 14, the other end of arm 15 preferably carries an armature member 16 arranged to cooperate with an E-core type of transformer 17, the elements 16, 17 forming what is commonly known as an E-pickoff for sensing movements of arm 15. A suitable source of alternating current voltage is employed to excite the winding on the center leg of transformer 17, while the windings on the outer legs are connected in controlling relation to a conventional servomotor amplifier 18. The output of amplifier 18 is connected to energize a motor 19 whose shaft 25 at one end thereof carries a worm gear 20 meshing with a worm wheel 21 rotatably mounted on shaft 14. Fixed to wheel 21 is one end of a linear resilient device such as an isoelastic coil spring 23 surrounding the shaft 14 and having its other end fixed to an adjustable collar 27 adapted to be securely fastened to shaft 14 by a set screw 28.

By this arrangement, the net force exerted by electromagnets 1, 2 will move armature 7 a slight amount, only, before a signal generated at transformer 17 controls motor 19 to actuate spring 23 to balance said force, reducing said signal to substantially a zero value. The angular distance through which motor 19 rotates to balance the net magnetic force with a spring-derived force is, therefore, proportional to the magnetic force itself. Hence, to obtain an indication of this force, i. e., an indication of the product of the current inputs to electromagnets 1, 2, I have provided a pointer 24 fixed to the shaft 25 and cooperating with a suitably calibrated dial 26.

Figure 2:
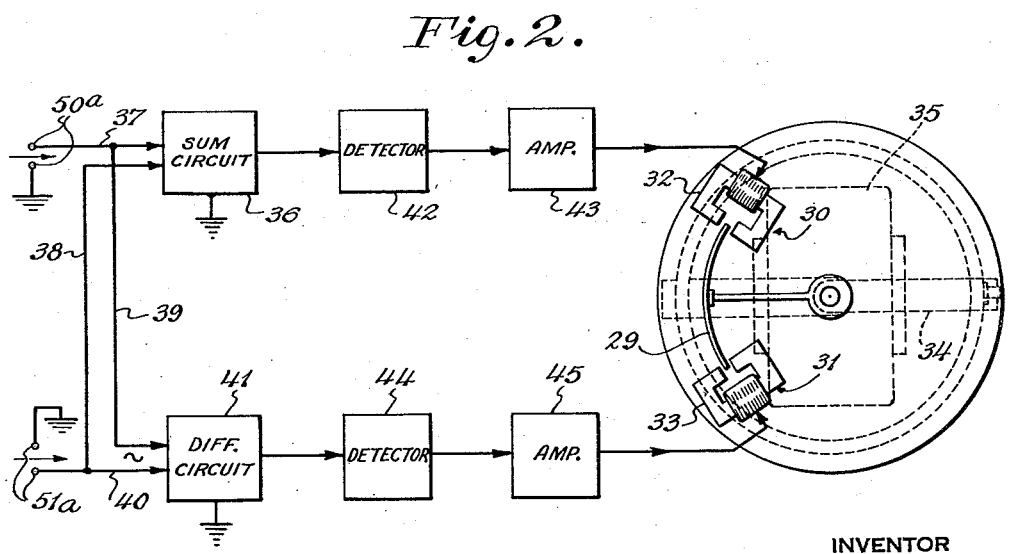
Fig. 2 shows another form of the present invention embodied in a torquer arrangement for precessing a gyroscope at a rate in accordance with the product of two electrical inputs.

Referring to Fig. 2, another form of my invention is illustrated as embodied in a torquer arrangement for a gyroscope. As in Fig. 1, a generally T-shaped armature 29 is mounted to cooperate with two fixed electromagnets 30, 31 having generally C-shaped cores 32, 33, respectively. However, instead of the stem end of armature 29 being connected to a shaft actuating an E-pickoff, it is fixed to a gimbal ring 34 of a conventional three degrees-of-freedom gyroscope 35. Moreover, each of electromagnets 30, 31 has but one winding instead of the two windings of Fig. 1.

In order to create a net magnetic force on armature 29 proportional to the product of two input currents $I_1$, $I_2$, I provide means whereby the current reaching the single winding of electromagnet 30 is proportional to the sum $(I_1+I_2)$ of the two input currents, and whereby the current reaching the single winding of electromagnet 31 is proportional to the difference $(I_1-I_2)$ of the two input currents. In this connection, a conventional summing circuit 36 receives the first input current $I_1$ from a suitable variable amplitude, reversible sign current source such as source 50 which is connected across terminals 50a. This current is supplied via a lead 37, and the second input current $I_2$ is derived from a similar source such as source 51, connected across terminals 51a, and supplied via a lead 38 to circuit 36. The first and second input currents are also fed via leads 39, 40, respectively, to a conventional subtracting or differencing circuit 41. Although currents $I_1$ and $I_2$ are described as supplied from sources of variable current 50, 51 respectively, it is assumed for the present embodiment that sources 50, 51 supply alternating currents instead of the direct currents described for purposes of illustration in connection with Fig. 1. That is to say, in Fig. 2, $I_1$ and $I_2$ are preferably alternating currents of variable magnitude and sign. By "sign," I mean "phase" when referring to $I_1$ and $I_2$ as alternating current inputs, and "polarity" when referring to $I_1$ and $I_2$ as direct current inputs.

The output of summing circuit 36 is proportional to the sum of the two input currents, and is fed via suitable detector 42 to a conventional amplifier 43 whose D.-C. output is connected to energize the winding of electromagnet 30. By the same token, the output of differencing circuit 41 is proportional to the difference between the two input current, and is fed via a suitable detector 44 to a conventional amplifier 45 whose D.-C. output is connected to energize the winding of electromagnet 31.

By this arrangement, the magnetic force exerted by electromagnet 30 on armature 29 is proportional to the square of the sum of the input currents to the system, while the magnetic force exerted by electromagnet 31 is proportional to the square of the difference of the input currents. Hence, the net or resultant force acting on armature 29 is proportional to the difference of said squares or to the product of the two input currents. By virtue of the fixed connection of the stem end of armature 29 to gimbal 34 of gyroscope 35, the net force exerted on the armature gives rise to a torque on the gyroscope proportional to said force, hence to the product of the system inputs. It is well-established that a gyroscope will precess at a rate proportional to the torque applied thereto; therefore, the foregoing system comprises a gyroscope torquer capable of effecting a gyroscopic precession at a rate proportional to the product of two current inputs to the system, i. e. the precession rate will be proportional to the product of two selected quantities.

Each form of my invention is such as to effect a true multiplication in producing a force proportional to the product of two electrical inputs. For given magnitudes of $I_1$ and $I_2$ the direction of the net force exerted on the respective armatures is dependent on the signs of the inputs. That is to say, when $I_1$ and $I_2$ are of the same sign, the respective armatures will be urged in a given direction, and when $I_1$ and $I_2$ are of different signs, the armatures are each urged in a direction opposite to the given direction.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. An electromagnetic torquing system comprising a first electromagnet, a second electromagnet, an armature pivotally mounted for movement toward one electromagnet concomitant with movement away from the other electromagnet, a first source of input current, a second source of input current, means for adding the two currents, first transmission means for connecting the output of said adding means in controlling relation to said first electromagnet, said first electromagnet thereby being energized to exert a force on said armature in proportion to the square of the sum of said currents, means for subtracting the two currents, and second transmission means for connecting the output of said subtracting means in controlling relation to said second electromagnet, said second electromagnet thereby being energized to exert a force on said armature in proportion to the square of the difference of said currents, whereby the net force exerted on said armature tends to torque the armature about its pivot in accordance with the difference of said squares or the product of said currents.

2. A computing device for supplying a force proportional to the product of two electrical inputs, said device comprising first electromagnetic means including a first core member having an air gap, a first winding adapted to be energized by the first of said two electrical inputs, and a second winding adapted to be energized by the second of said two electrical inputs, said first and second winding being wound about said first core member so as to produce fluxes therein of the same direction, a second electromagnetic means including a second core member having an air gap, a third winding connected in series circuit relation to said first winding, and a fourth winding connected in series circuit relation to said second winding, said third and fourth windings being wound about said second core member so as to produce fluxes therein of opposite directions, an armature member having one end thereof normally partially disposed in the air gap of said first core member and the other end thereof normally partially disposed in the air gap of said second core member, said armature member being pivotally mounted for movement within the respective air gaps, whereby on energization of said windings the net force exerted by the first and second electromagnetic means on said armature is of a magnitude proportional to the product of said two electrical inputs and of a direction dependent on the sign of said product.

3. An electromagnetic torquing system for a gyroscope having a rotor supported by a plurality of gimbal rings, means for supporting said gimbal rings, first and second electromagnets, a common armature for said electromagnets fixed to one of said gimbal rings, said electromagnets being fixed to said gimbal ring supporting means and arranged to exert oppositely-directed magnetic forces on said armature, a first source of input current, a second source of input current, means for adding the two currents, first transmission means for connecting the output of said adding means in controlling relation to said first electromagnet, said first electromagnet thereby being energized to exert a force on said armature in proportion to the square of the sum of said currents, means for subtracting the two currents, and second transmission means for connecting the output of said subtracting means in controlling relation to said second electromagnet, said second electromagnet thereby being energized to exert a force on said armature in proportion to the square of the difference of said currents, whereby the net force exerted on said armature tends to precess the gyroscope at a rate and in a direction in accordance with the difference of said squares or the product of said currents.

4. An electromagnetic system for precessing a gyroscope with a force proportional to the product of two current inputs to the system, said gyroscope having a rotor supported by a plurality of gimbal rings, said system comprising means for supporting said gimbal rings, first and second electromagnets, a common armature for said electromagnets fixed to one of said gimbal rings, said electromagnets being fixed to said gimbal ring supporting means and arranged to exert oppositely-directed magnetic forces on said armature, and means connecting said current inputs in controlling relation to said electromagnets such that one of said electromagnets produces a field dependent upon the sum of the two currents and the other of said electromagnets produces a field dependent upon the difference between said currents, whereby said one electromagnet exerts a force on the armature in proportion to the square of the sum of said currents, and whereby said other electromagnet exerts a force on the armature in proportion to the square of the difference of said currents, the resultant force on said armature being of a magnitude in proportion to the product of said currents and of a direction dependent on the sign of said product.

5. A force-producing system comprising a source of first current of variable magnitude and sign, a source of second current of variable magnitude and sign, a pivotally-mounted armature member, first electromagnetic means energized from said current sources to produce a pivoting force on said armature member proportional to the square of the sum of said first and second currents, and second electromagnetic means energized from said current sources to produce a pivoting force on said armature member proportional to the square of the difference between said first and second currents, said first and second electromagnetic means being so disposed in relation to said armature member as to exert their respective pivoting forces on said member in opposite directions, whereby the resultant force exerted on said armature member is of a magnitude proportional to the product of said first and second currents and in a direction dependent on the sign of said product.

6. An electromagnetic torquing system comprising a first electromagnet, a second electromagnet, an armature pivotally mounted for movement toward one electromagnet concomitant with movement away from the other electromagnet, a first source of input alternating current, a second source of input alternating current, means for adding the two input currents, first transmission means connecting said adding means to said first electromagnet, said first transmission means including a detector for supplying a direct current proportional to the output of said adding means in controlling relation to said first electromagnet, said first electromagnet thereby being energized to exert a force on said armature in proportion to the square of the sum of said input currents, means for subtracting the two input currents, and second transmission means connecting said subtracting means to said second electromagnet, said second transmission means including a detector for supplying a direct current proportional to the output of said subtracting means in controlling relation to said second electromagnet, said second electromagnet thereby being energized to exert a force on said armature in proportion to the square of the difference of said input currents, whereby the net force exerted on said armature tends to torque the armature about its pivot in accordance with the difference of said squares or the product of said input currents.

7. A system for producing a force proportional to the product of two system input currents, said system comprising a pivotally-mounted armature member, first electromagnetic means energized according to the sum of said input currents, and second electromagnetic means energized according to the difference between said input currents, said first and second electromagnetic means being disposed in cooperative relation to said armature member so as to exert opposing electromagnetic forces thereon about the pivotal mounting of said member, whereby the resultant force exerted on said armature member is proportional to the product of said first and second currents.

References Cited in the file of this patent

UNITED STATES PATENTS

| | | |
|---|---|---|
| 1,677,378 | Albrecht | July 17, 1928 |
| 1,948,912 | Geyger | Feb. 27, 1934 |
| 2,206,416 | Mathes | July 2, 1940 |
| 2,382,295 | Conrad | Aug. 14, 1945 |
| 2,401,447 | Wipff | June 4, 1946 |
| 2,535,250 | Allen | Dec. 26, 1950 |
| 2,625,327 | Agins | Jan. 13, 1953 |

OTHER REFERENCES

Review of Scientific Instruments, vol. 22, No. 9, September 1951, pages 683–687.